(12) United States Patent
Simmons (10) Patent No.: US 7,571,915 B1
(45) Date of Patent: Aug. 11, 2009

(54) WHEEL-MOUNTED TOOL CHEST

(76) Inventor: Andrew M. Simmons, 14868 Bluff Rd., Summerdale, AL (US) 36580-4261

( * ) Notice: Subject to any disclaimer, the term of this patent is extended or adjusted under 35 U.S.C. 154(b) by 169 days.

(21) Appl. No.: 11/923,065

(22) Filed: Oct. 24, 2007

(51) Int. Cl.
*B62B 1/24* (2006.01)
(52) U.S. Cl. .................... 280/47.26; 280/655.1
(58) Field of Classification Search ........... 280/43.1, 280/47.131, 47.17, 47.19, 47.24, 47.26, 47.315, 280/655.1; 190/39, 115
See application file for complete search history.

(56) References Cited

U.S. PATENT DOCUMENTS

| | | | |
|---|---|---|---|
| 4,733,703 A | | 3/1988 | Cimino |
| 4,795,180 A | * | 1/1989 | Polcyn ................... 280/79.11 |
| 5,224,531 A | * | 7/1993 | Blohm ....................... 144/285 |
| D361,910 S | | 9/1995 | Maple et al. |
| 5,452,908 A | * | 9/1995 | Bencic ..................... 280/47.35 |
| 5,460,391 A | * | 10/1995 | Gantz et al. ................... 280/30 |
| 5,553,692 A | | 9/1996 | Sheiman |
| 5,588,659 A | * | 12/1996 | Boes et al. ................ 280/47.19 |
| 5,641,170 A | * | 6/1997 | Helm ............................ 280/30 |
| 5,799,958 A | * | 9/1998 | Bishop ..................... 280/47.26 |
| 6,170,839 B1 | * | 1/2001 | Kizewski .................. 280/47.26 |
| 6,176,559 B1 | * | 1/2001 | Tiramani et al. ............ 312/108 |
| 6,431,580 B1 | * | 8/2002 | Kady .......................... 280/655 |
| 6,688,615 B2 | * | 2/2004 | Chen ....................... 280/47.35 |
| 6,761,366 B1 | * | 7/2004 | Klemmensen et al. ... 280/47.26 |
| 7,503,569 B2 | * | 3/2009 | Duvigneau ............... 280/47.18 |

\* cited by examiner

*Primary Examiner*—Christopher P Ellis
*Assistant Examiner*—Bridget Avery (57) ABSTRACT

This patent discloses a wheel-mounted tool chest configured to keep tools in place even if the wheel-mounted tool chest is turned upside down and back upright. The tool chest may include a lid, a handle, and wheels attached to a box having a T-shape profile. The box may include socket trays and may be divided into three compartments by two partitions. A chamber plate may be removeably secured over a front chamber of the third compartment. The chamber plate may hold screwdrivers and wrenches vertically. The chamber plate may be positioned relative to the lid such that when the lid is closed, the screwdrivers and wrenches may be keep in place even if the tool chest is turned upside down and back upright.

18 Claims, 8 Drawing Sheets

WHEEL-MOUNTED TOOL CHEST

BACKGROUND

1. Field

The information disclosed in this patent relates to a tool chest to organize, carry, and protect hand tools that may be used for trade, hobby and do it yourself projects.

2. Background Information

Tools are a necessity in the marine construction business. Whether building seawalls, bridges, docks, or culverts, time is of the essence when searching for the right hand tool. If a crew of workers at a job site spend time trying to locate a needed tool, which increases the construction costs and causes worker frustration.

Most toolboxes do not allow easy access to the tools. In addition, the tools in most toolboxes become dislodged into an unorganized mess when jostled around. Thus, there is a need to store and locate tools in an organized and efficient matter to save time and money at a job site.

SUMMARY

This patent discloses a wheel-mounted tool chest configured to keep tools in place even if the wheel-mounted tool chest is turned upside down and back upright. The tool chest may include a lid, a handle, and wheels attached to a box having a T-shape profile. The box may include socket trays and may be divided into three compartments by two partitions. A chamber plate may be removeably secured over a front chamber of the third compartment. The chamber plate may hold screwdrivers and wrenches vertically. The chamber plate may be positioned relative to the lid such that when the lid is closed, the screwdrivers and wrenches may be keep in place even if the tool chest is turned upside down and back upright.

DETAILED DESCRIPTION

Figure 1:
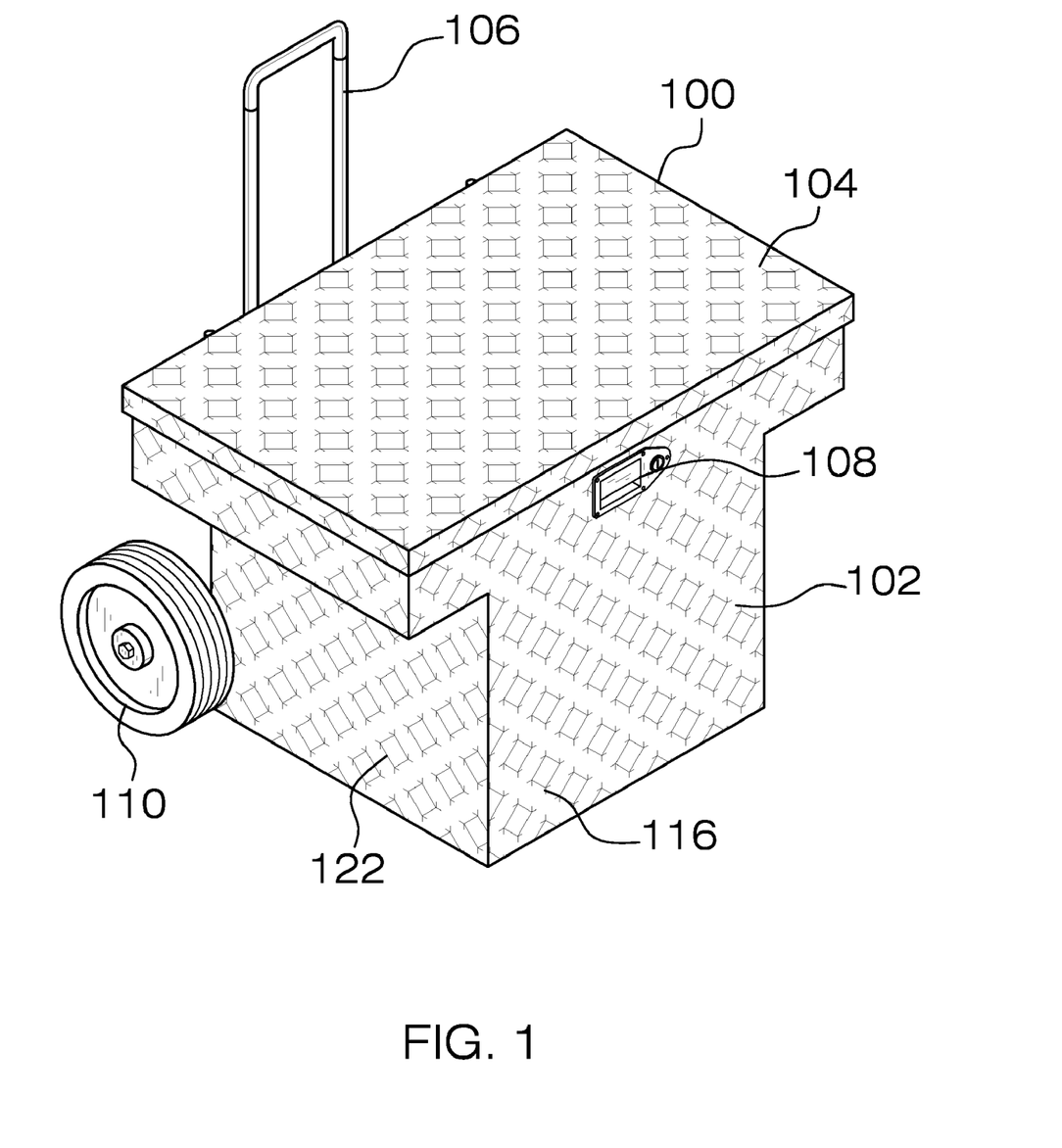
FIG. 1 is a front isometric view of a tool chest 100.
Figure 2:
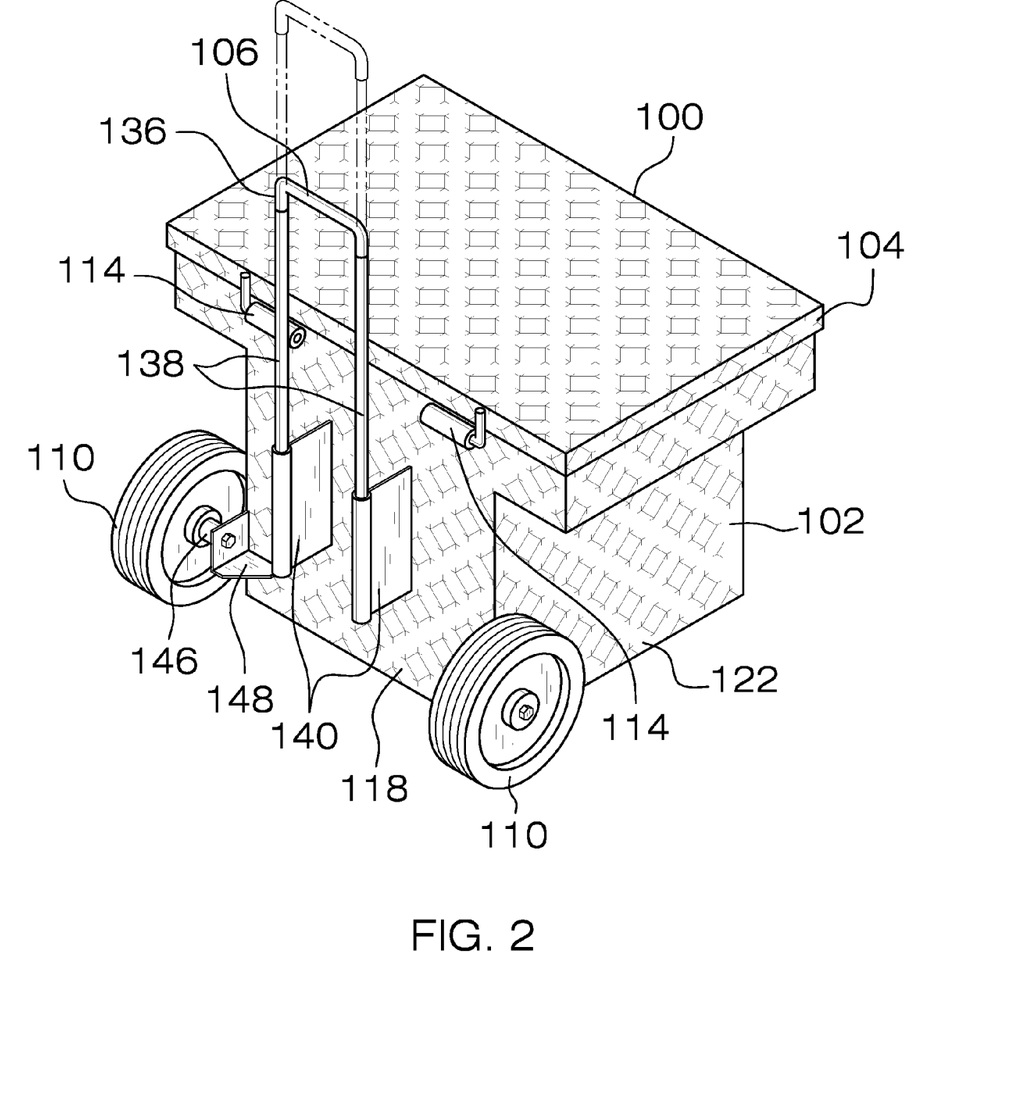
FIG. 2 is a rear isometric view of a tool chest 100.

FIG. 1 is a front isometric view of a tool chest 100. FIG. 2 is a rear isometric view of a tool chest 100. Tool chest 100 may be a cabinet to organize, carry, and protect hand tools that may be used for trade, hobby or do it yourself projects. Tools in tool chest 100 may be positioned vertically so that each tool may be as accessible as the next tool. In addition, tool chest 100 lacks slide out drawers and other type of layering features that place obstacles in the path of needed tools. Along with other features, tool chest 100 is durable, lightweight, portable, compact, lockable, and easily organized. In addition, tool chest 100 may include features that work to keep every tool in place even if tool chest 100 is turned upside down and back upright.

Tool chest 100 may include a box 102, a lid 104, a handle 106, a lock 108, and wheels 110. Lid 104 may be attached on top of box 102 with hinges 114 (FIG. 2) and secured to box 102 with lock 108. Both handle 106 and wheels 110 may be attached to box 102.

Figure 3:
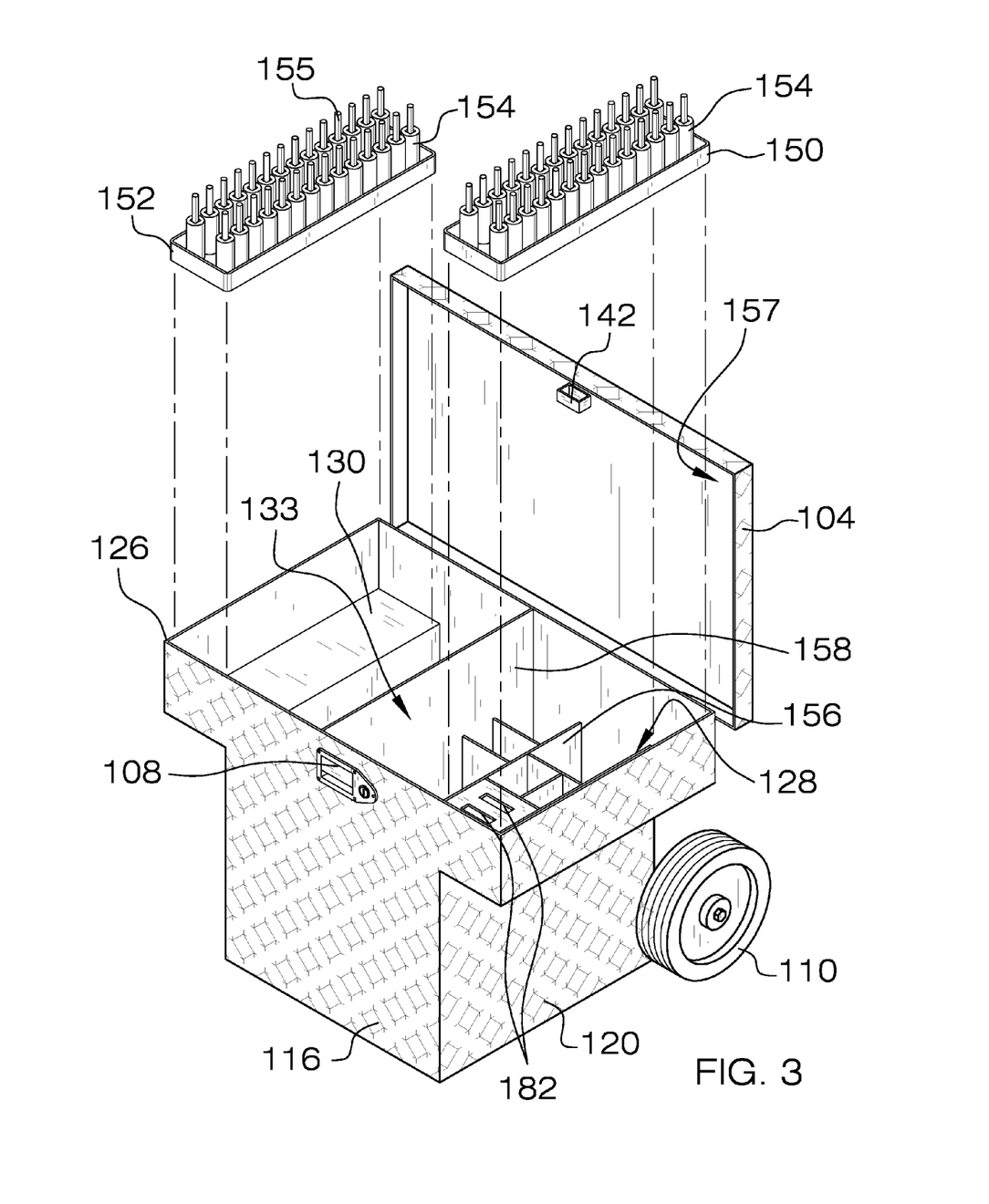
FIG. 3 is an exploded isometric view of tool chest 100.
Figure 4:
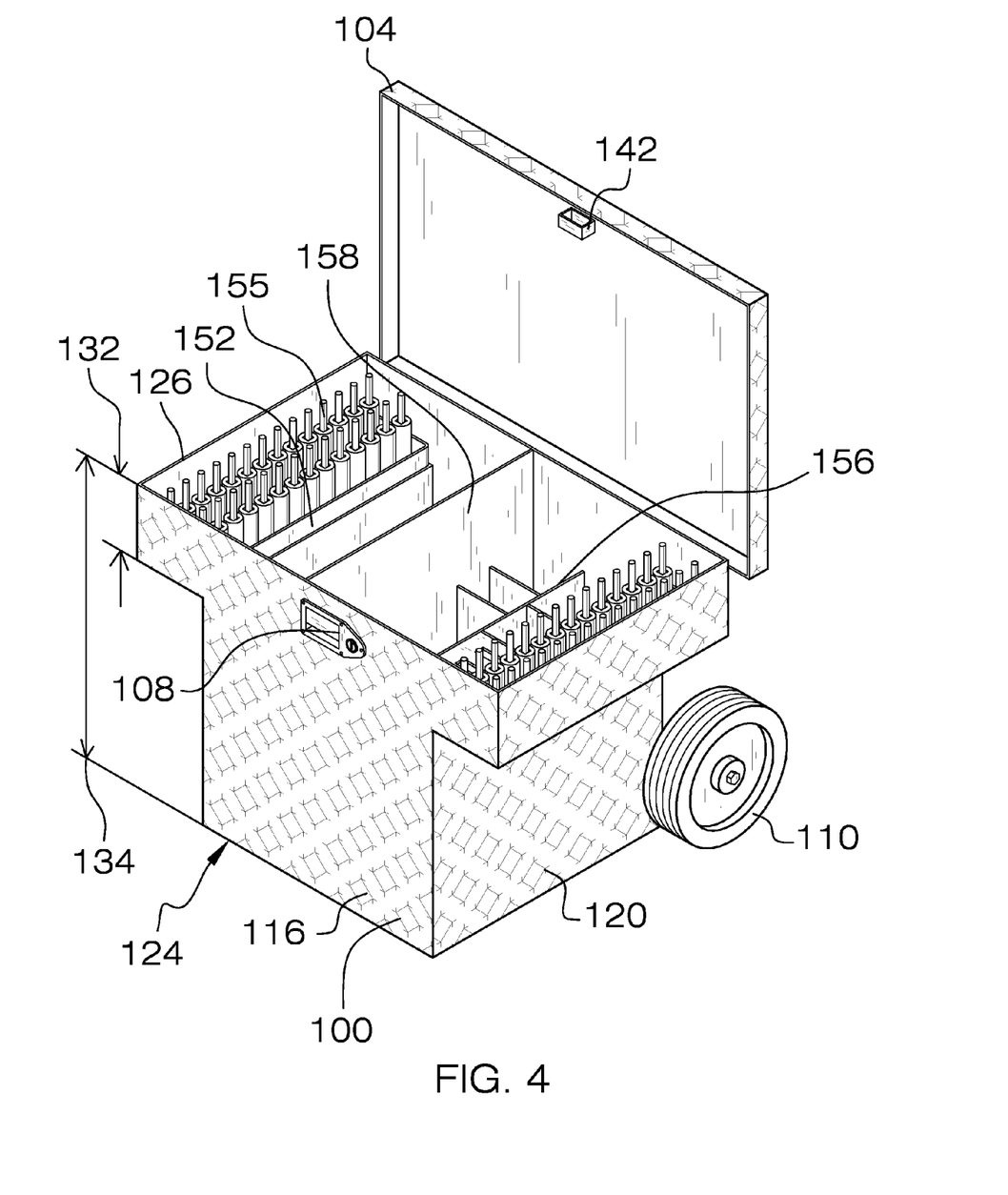
FIG. 4 is an isometric view of tool chest 100 with lid 104 in an open position.

FIG. 3 is an exploded isometric view of tool chest 100. FIG. 4 is an isometric view of tool chest 100 with lid 104 in an open position.

Box 102 may be a container generally having a T-shape profile. Box 102 may include a box front 116, a box rear 118 (FIG. 2), a box right side 120 (FIG. 3) and a box left side 122 (FIG. 2) connecting box front 116 to box rear 118, a box bottom 124 (FIG. 4) and a box upper surface 126 (FIG. 2) connected by box front 116. Box 102 may include a right shelf 128 adjacent to box right side 120 and a left shelf 130 (FIG. 3) adjacent to box left side 122. Right shelf 128 and left shelf 130 may extend between box front 116 and box rear 118 and may be positioned at a shelf distance 132 (FIG. 4) from box upper surface 126. Box 102 may have a box interior 133 (FIG. 3) and a box height 134 (FIG. 4). In one example, a ratio of box height 134 to shelf distance 132 may be 4:1. This ratio may provide a snug fit for predetermined tools to keep these tools in place even if tool chest 100 is turned upside down and back upright.

Lid 104 may be a cover that may be utilized to open and close box 102 as an upper portion of tool chest 100. Lid 104 may be configured to engage and surround box upper surface 126. In one example, lid 104 may include a flat surface with four sides projecting from the flat portion. Both box 102 and lid 104 may be made from diamond plate aluminum.

Handle 106 (FIG. 2) may be that part of tool chest 100 that may be used by hand to bring box 102 and other items of tool chest 100 along with handle 106. Handle 106 may include a U-shaped grip piece 136 having prongs, where prongs may be configured to move in and out of tubes 138. Tubes 138 may be hollow cylinders connected to support brackets 140. Support brackets 140 may be structural supports connected to and projecting from box rear 118. This may transfer certain movements of U-shaped grip piece 136 to box 102. Since U-shaped grip piece 136 may move in and out of tubes 138, U-shaped grip piece 136 may be stored within tubes 138 when not in use and telescoped out of tubes 138 when in use.

Figure 5:
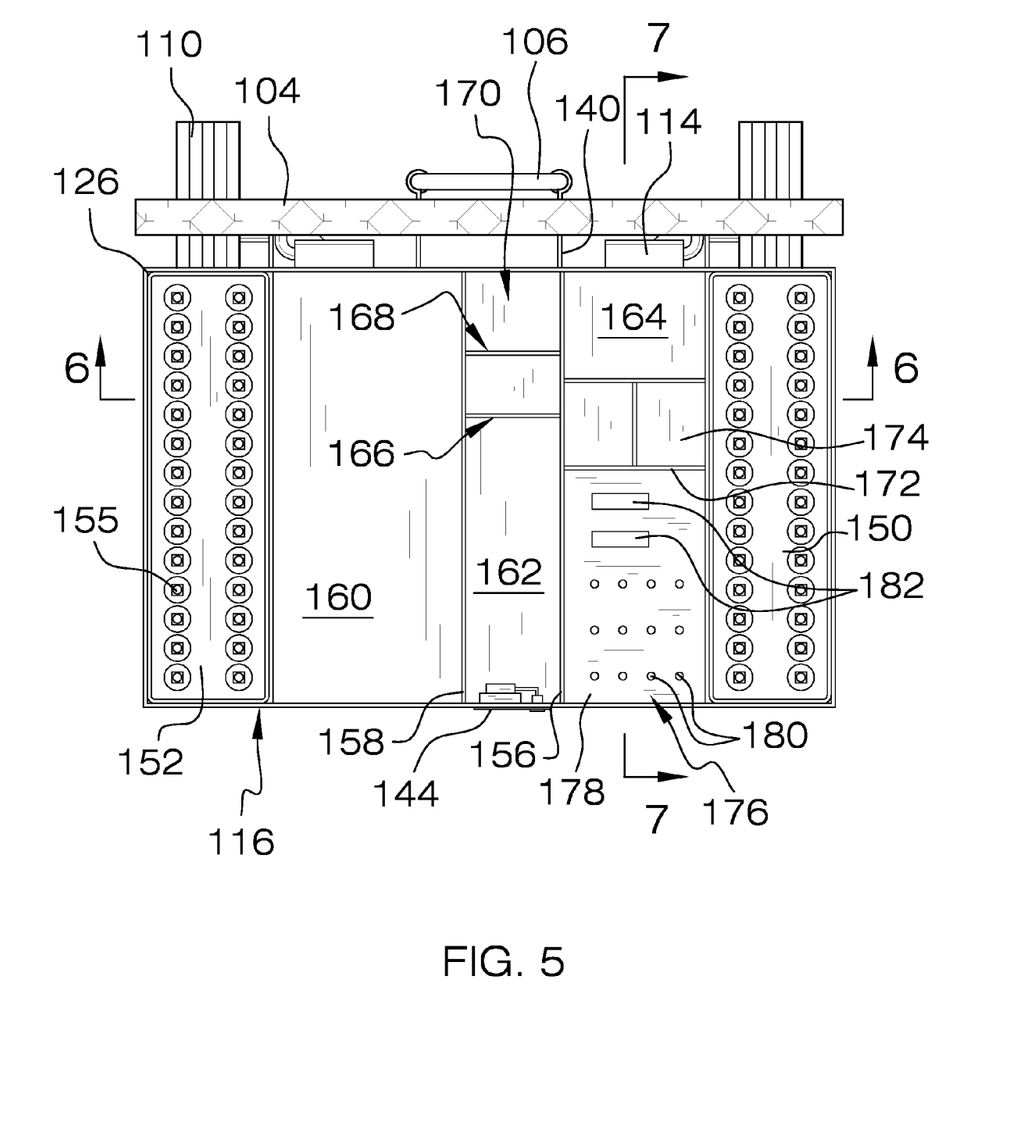
FIG. 5 is a top view of tool chest 100 with lid 104 in an open position.

Lock 108 may be a mechanical device that may automatically keep a lid 104 closed until a deliberate action is used, such as to raise lid 104. Lock 108 may include a catch 142 (FIG. 4) and a latch 144 (FIG. 5). Catch 142 may be a loop configured to be seized by latch 144 and latch 144 may be a hook configured to seize catch 142. Lock 108 may be open and closed with a key. Lock 108 may be position offset from a mid point between box right side 120 and box left side 122. This may assist in the arrangement of compartments within box 102.

Wheels 110 may be circular objects that assist in reducing the friction during transport of tool chest 100. Tool chest 100 may include two wheels 110. Each wheel 110 may be connected to an axle 146 (FIG. 2). Axles 146 may be shafts on which wheels 110 may rotate. Axles 146 may be connected to box rear 118 through wheel brackets 148. In one example, wheels 110 may have a diameter approximately of eight inches. In another example, wheels 110 may have a diameter approximately of eight to ten inches.

Hinges 114 (FIG. 2) may be jointed devices that may allow lid 104 to pivot relative to box 102. Hinges 114 may include springs to provide a self-opening assist feature once lid 104 is raised to a predetermined angle relative to box upper surface 126. In one example, the predetermined angle is not less than thirty degrees since experiments have shown that anything less than thirty degrees will not allow a user to retain sufficient control over lid 104. In another example, the predetermined angle is not more than forty degrees since experiments have shown that anything more will render the self-opening assist feature substantially ineffective due to a realignment of a center of gravity of lid 104 as lid 104 is rotated upwards. In a further example, when lid 104 is open to a position substantially perpendicular to box upper surface 126, lid 104 may be remote from and mat not be touching box 102 directly (FIG. 3) to provide an unblocked path to and from box interior 133.

Tool chest 100 additionally may include a right socket tray 150 (FIG. 3), a left socket tray 152, and sockets 154. Sockets 154 may be hollow receptacles having shaped holes to fit over a nut or a bolt head. Both right socket tray 150 and left socket tray 152 may be open receptacles to hold and display sockets 154 vertically. In one example, at least one of right socket tray 150 and left socket tray 152 may be a socket tray having vertical pegs 155. Sockets 154 may be those manufactured by Hansen Global of Two Rivers, Wis., United States. Right socket tray 150 may reside on right shelf 128 and left socket tray 152 may reside on left shelf 130 such that lid 104 may be positioned no more than ¼-inch above trays 150, 152. In a further example, right socket tray 150 and left socket tray 152 may be secured from sliding horizontally by one or more foam pads attached to a lid interior 157 of lid 104 substantially above right shelf 128 an left shelf 130 such that when lid 104 is closed, the foam pad(s) may engage vertical pegs 155.

Figure 6:
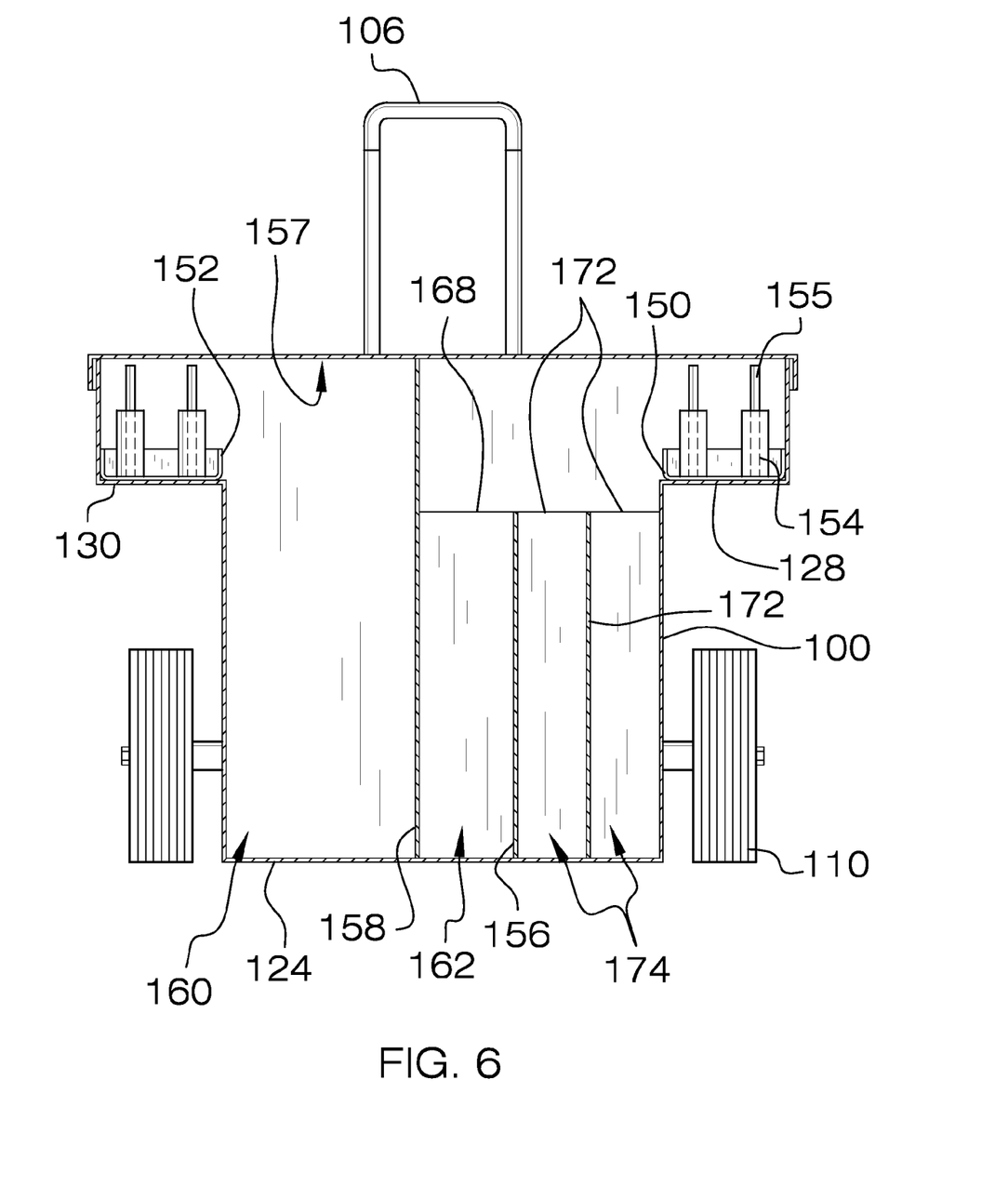
FIG. 6 is a front section view of tool chest 100 generally taken off line 6-6 of FIG. 5.
Figure 7:
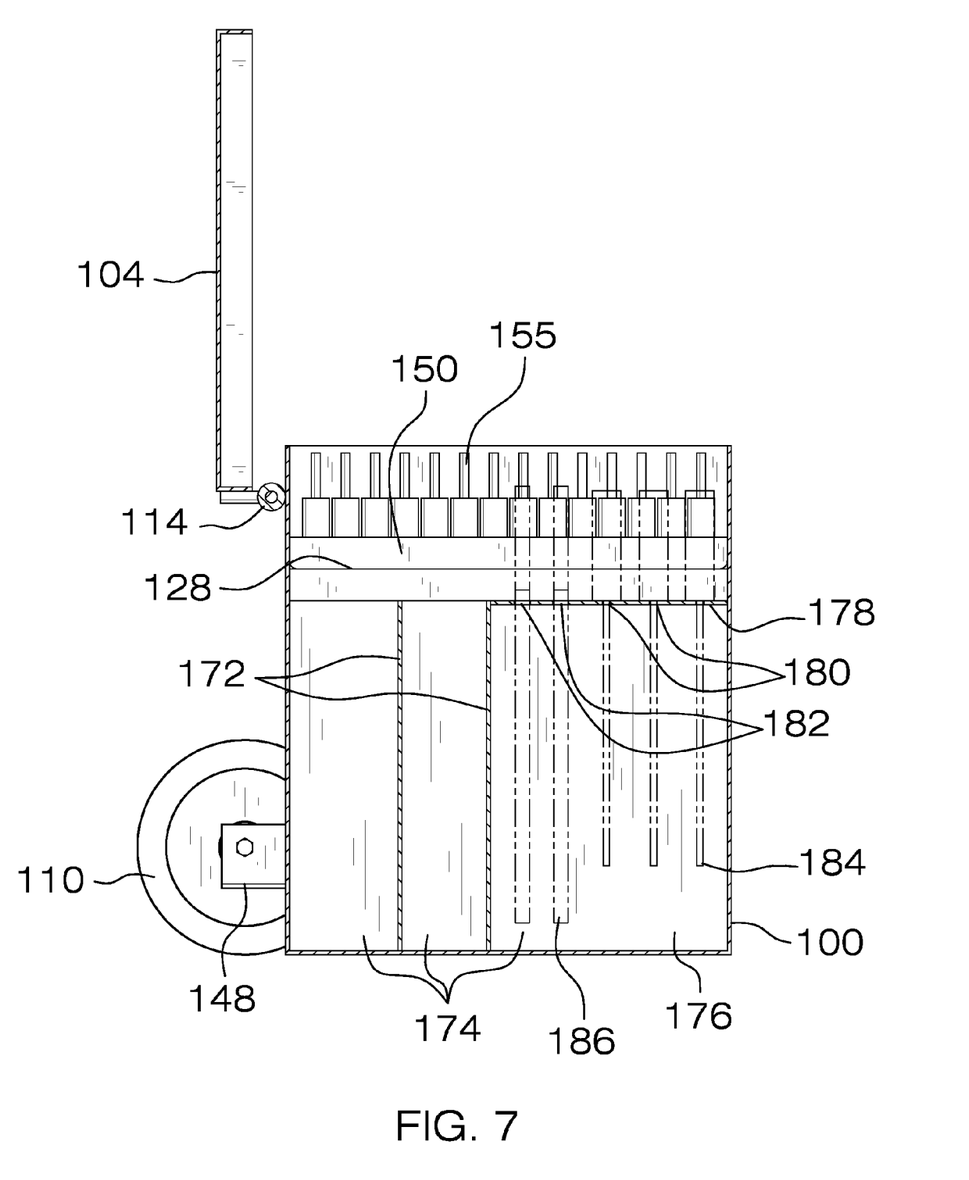
FIG. 7 is a left side section view of tool chest 100 generally taken off line 7-7 of FIG. 5.

FIG. 5 is a top view of tool chest 100 with lid 104 in an open position. FIG. 6 is a front section view of tool chest 100 generally taken off line 6-6 of FIG. 5. FIG. 7 is a left side section view of tool chest 100 generally taken off line 7-7 of FIG. 5. Tool chest 100 generally may include a particular arrangement of partitions and dividers to form compartments into which tools may be stored vertically Tool chest 100 may include a first partition 156 and a second partition 158. Partitions 156, 158 may be vertical structures that may extend along box bottom 142 and between box front 116 and box rear 118 to separate box interior 133 (FIG. 3) into a first compartment 160 (FIG. 5), a second compartment 162, and a third compartment 164. In one example, the first partition 156 and the second partition 158 are fixed in place such that they may not be removed.

Partitions 156, 158 may extend along box bottom 124. However, first partition 156 may extend to a height that may be below right shelf 128 and second partition 158 may extend to a height that substantially resides at box upper surface 126. Thus, when lid 104 is closed, first compartment 160 largely may be isolated from second compartment 162 and third compartment 164 and second compartment 162 may not be isolated from third compartment 164.

Compartments 160, 162, and 164 each may be storage areas within box interior 133 that may be separated by a physical structure. First compartment 160 may be larger than compartments 162, 164. In one example, first compartment 160 approximately may measure 6×14×16 inches. Compartments 162, 164 each may include dividers to subdivide these compartments further.

Second compartment 162 may include a first divider 166 and a second divider 168. First divider 166 and second divider 168 may be connected between first partition 156 and second partition 158 to create three rectangular shaped chambers 170 within second compartment 162. Each of the three rectangular shaped chambers 170 may have a unique cross sectional area.

Third compartment 164 may include an I-shaped divider 172. I-shaped divider 172 may create four rectangular shaped chambers 174. Four rectangular shaped chambers 174 may include a front chamber 176 (FIG. 5 and FIG. 7) that may be positioned adjacent to box front 116. A chamber plate 178 may be removeably secured over front chamber 176. I-shaped divider 172, first divider 166, and a second divider 168 each may extend along box bottom 124 to substantially the same height as first partition 156.

Chamber plate 178 may be a flat sheet of material having plate holes 180 and plate slots 182. Plate holes 180 may be configured to receive screwdrivers 184 and hold those screwdrivers vertically. Plate slots 182 may be configured to receive wrenches 186 and hold those wrenches vertically.

Figure 8:
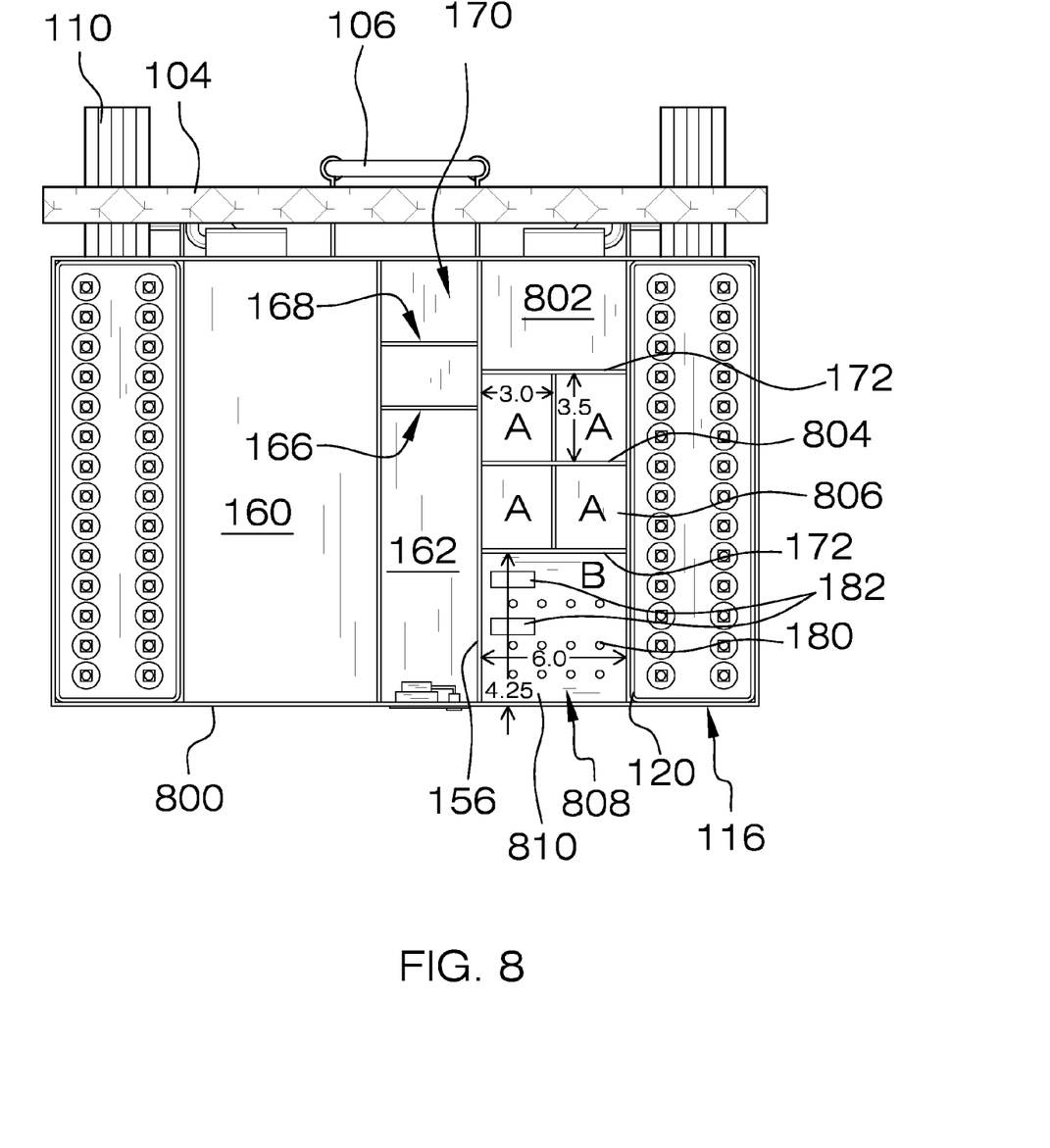
FIG. 8 is a top view of a tool chest 800 as a modified version of tool chest 100 of FIG. 5 with lid 104 in an open position.

FIG. 8 is a top view of a tool chest 800 as a modified version of tool chest 100 of FIG. 5 with lid 104 in an open position. In addition to including first compartment 160 and second compartment 162, tool chest 800 may include a third compartment 802 positioned between box right side 120 and first partition 156. Third compartment 802 may include a midpoint divider 804 positioned through a mid point of I-shaped divider 172 to create a total of six rectangular shaped chambers 806 within third compartment 802.

Six rectangular shaped chambers 806 may include a chamber 808 that may be positioned adjacent to box front 116. A chamber plate 810 may be removeably secured over chamber 808. In this example, chamber plate 810 may include eleven plate holes 180 to receive screwdrivers 184 and hold those screwdrivers vertically and two plate slots 182 to receive wrenches 186 and hold those wrenches vertically.

Six rectangular shaped chambers 806 may include four rectangular shaped chambers "A" and one rectangular shaped chamber "B." In one example, each of the four rectangular shaped chambers "A" have a similar cross sectional area and a ratio of a cross sectional area of rectangular shaped chamber "B" to that of a cross sectional area of rectangular shaped chamber "A" approximately may be 2.4:1. In another example, a cross sectional area of rectangular shaped chamber "B" approximately may be 6.0×4.25 inches and a cross sectional area of rectangular shaped chamber "A" approximately may be 3.0×3.5 inches.

The tool chest may be a wheel-mounted tool chest that may store the tools and supplies in a vertical, highly organized orientation to enable them to be accessed easily. The chest may be produced from aluminum and may measure 22-inches long, 14-inches wide, and 16-inches high. The tool chest may include a box-like container mounted on rear wheels. The wheels may be affixed to an axle extending across the rear of the box. The box may be pivoted backward on the wheels to allow it to be rolled.

A person may grasp a plastic handle while rolling this tool chest. This handle may be positioned on a rear of the box receptacle. The handle may feature a telescopic design, enabling it to be extended and retracted as desired. The wheel-mounted tool chest need not include slide out drawers since this may minimize obstacles in direct path of needed tools. Thus, each tool stored within the wheel-mounted tool chest according to a predetermined plan may be individually and directly accessible once the lid is raised. A need to move one tool or drawer out of the way to access another tool may be eliminated by the particular arrangement of partitions and dividers forming compartments into which tools maybe stored vertically.

The interior of this storage space may be divided into several compartments. Each of these compartments may be designed to contain various types of tools. The largest components may be used to store both metric and standard English sockets. Other smaller compartments may be used to contain tools such as pliers, a hammer, pipe wrenches, and adjustable wrenches. A large open compartment may be used to store miscellaneous supplies.

A hinged lid may be lowered and raised to reveal or seal the items contained within this storage box. A latch may be used to secure the lid. When latched, the lid may enable this unit to be turned on its side or upside down without dislodging any of the contents. The stored items may remain in place even if this storage unit tumbled down a flight of stairs. The tight fit of the stored tools and supplies within their designated compartments may ensure the items remained securely in place as well. A lock may be integrated into the latch. When the lock is engaged, the items contained within this tool chest may be secured from being stolen. A key may be used to disengage the lock.

The tool chest may fulfill a need for a wheel-mounted tool chest that may store the tools and supplies in a vertical, highly organized orientation to enable them to be easily accessed. Appealing features the tool chest may be its mobility, ease of use, convenience, durability, organization, accessibility, secure containment of tools and work supplies, timesaving qualities and efficiency, and cost effectiveness. An important aspect of the tool chest may be that the stored items may always remain securely in place. Even if this storage unit were turned on edge, the stored tools and supplies may remain in place.

The information disclosed herein is provided merely to illustrate principles and should not be construed as limiting the scope of the subject matter of the terms of the claims. The written specification and figures are, accordingly, to be regarded in an illustrative rather than a restrictive sense. Moreover, the principles disclosed may be applied to achieve the advantages described herein and to achieve other advantages or to satisfy other objectives, as well.

What is claimed is:

1. A wheel-mounted tool chest configured to keep tools in place even if the wheel-mounted tool chest is turned upside down and back upright, the wheel-mounted tool chest comprising:
    a box generally having a T-shape profile, where the box includes a box front, a box rear, a box right side and a box left side connecting the box front to the box rear, a box bottom connected to a box upper surface by the box front, a right shelf adjacent to the box right side and a left shelf adjacent to the box left side, where the right shelf and the left shelf extend between the box front and the box rear and each is positioned at a shelf distance from the box upper surface, where the box further includes a box interior, a box height, a right socket tray on the right shelf, a left socket tray on the left shelf, where each socket tray includes vertical pegs to hold and display sockets vertically;
    a lid attached to the box through hinges;
    a handle attached to the box;
    wheels attached to the box;
    a first partition and a second partition, where both the first partition and the second partition are vertical structures that extend between the box front and the box rear to separate the box interior into a first compartment, a second compartment, and a third compartment,
    where the second compartment includes a first divider and a second divider positioned parallel to the first divider, where the first divider and the second divider is connected between the first partition and the second partition to create three rectangular shaped chambers within the second compartment,
    where the third compartment includes an I-shaped divider positioned to create four rectangular shaped chambers within the third compartment, where the four rectangular shaped chambers include a front chamber positioned adjacent to the box front; and
    a chamber plate removeably secured over the front chamber of the third compartment, where the chamber plate is a substantially flat sheet having plate holes configured to receive screwdrivers and hold the screwdrivers vertically and having plate slots configured to receive wrenches and hold the wrenches vertically, where the chamber plate is positioned relative to the lid such that when the lid is closed, the screwdrivers and wrenches are keep in place even if the wheel-mounted tool chest is turned upside down and back upright.

2. The wheel-mounted tool chest of claim 1, where the third compartment includes a midpoint divider positioned through a mid point of the I-shaped divider, where the four rectangular shaped chambers are six rectangular shaped chambers within the third compartment.

3. The wheel-mounted tool chest of claim 2, where the chamber plate includes eleven plate holes and two plate slots.

4. The wheel-mounted tool chest of claim 2, where the first partition and the second partition extend along the box bottom, where the first partition extends to a height that is below the right shelf and the second partition extends to a height that substantially resides at the box upper surface such that when the lid is closed, the first compartment largely is isolated from both the second compartment and the third compartment and the second compartment is not isolated from the third compartment.

5. The wheel-mounted tool chest of claim 3, where the six rectangular shaped chambers include four rectangular shaped chambers "A" and one rectangular shaped chamber "B," where each of the four rectangular shaped chambers "A" have a similar cross sectional area and a ratio of a cross sectional area of rectangular shaped chamber "B" to that of a cross sectional area of rectangular shaped chamber "A" approximately is 2.4:1.

6. The wheel-mounted tool chest of claim 4, where the first compartment includes a volume that is larger than both a volume of the second compartment and a volume of the third compartment.

7. The wheel-mounted tool chest of claim 4, where each of the three rectangular shaped chambers of the second compartment has a cross sectional area that is unique as compared to the remaining rectangular shaped chambers of the second compartment.

8. The wheel-mounted tool chest of claim 4, where a ratio of the box height to the shelf distance is 4:1 to provide a snug fit for predetermined tools, where the snug fit works to keep these tools in place even if the wheeled-mounted tool chest is turned upside down and back upright.

9. The wheel-mounted tool chest of claim 4, where the handle includes a U-shaped grip piece having prongs configured to move in and out of tubes, where the tubes are hollow cylinders connected to support brackets and where the support brackets are connected to and projecting from the box rear such that the U-shaped grip piece is configured to be stored within the tubes when not in use and telescoped out of the tubes when in use.

10. The wheel-mounted tool chest of claim 4, further comprising:
    a lock configured to be opened and secured with a key, where the lock is position offset from a mid point between the box right side and the box left side to assist in the arrangement of compartments within the box.

11. The wheel-mounted tool chest of claim 4, where the wheels includes two wheels connected to an axle that is connected to the box rear through wheel brackets, where each wheel has a diameter approximately of eight to ten inches.

12. The wheel-mounted tool chest of claim 4, where the hinges includes springs to provide a self-opening assist once the lid is raised to a predetermined angle relative to the box upper surface, where the predetermined angle is not less than thirty degrees and not more than forty degrees.

13. The wheel-mounted tool chest of claim 4, where the right socket tray reside on the right shelf and the left socket tray resides on the left shelf such that the lid is positioned no more than ¼-inch above the right socket tray and the left socket tray to keep the vertically displayed sockets in place even if the wheeled-mounted tool chest is turned upside down and back upright.

14. The wheel-mounted tool chest of claim 4, where the I-shaped divider, the first divider of the second compartment, and the second divider of the second compartment each extend along the box bottom to substantially the same height as the first partition.

15. The wheel-mounted tool chest of claim 4, where the wheel-mounted tool chest does not include slide out drawers to minimize obstacles in direct path of needed tools such that each tool stored within the wheel-mounted tool chest according to a predetermined plan is individually and directly accessible once the lid is raised.

16. The wheel-mounted tool chest of claim 6, where the first compartment approximately measures 6×14×16 inches.

17. A wheel-mounted tool chest configured to keep tools in place even if the wheel-mounted tool chest is turned upside down and back upright, the wheel-mounted tool chest comprising:

a box generally having a T-shape profile, where the box includes a box front, a box rear, a box right side and a box left side connecting the box front to the box rear, a box bottom connected to a box upper surface by the box front, a right shelf adjacent to the box right side and a left shelf adjacent to the box left side, where the right shelf and the left shelf extend between the box front and the box rear and each is positioned at a shelf distance from the box upper surface, where the box further includes a box interior, a box height, a right socket tray on the right shelf, a left socket tray on the left shelf, where each socket tray includes vertical pegs to hold and display sockets vertically;

a lid attached to the box through hinges;

a handle attached to the box;

wheels attached to the box;

a first partition and a second partition, where both the first partition and the second partition are vertical structures that extend between the box front and the box rear to separate the box interior into a first compartment, a second compartment, and a third compartment, where the second compartment includes a first divider and a second divider positioned parallel to the first divider, where the first divider and the second divider is connected between the first partition and the second partition to create three rectangular shaped chambers within the second compartment, where the third compartment includes an I-shaped divider positioned to create four rectangular shaped chambers within the third compartment, where the four rectangular shaped chambers include a front chamber positioned adjacent to the box front; and a chamber plate removeably secured over the front chamber of the third compartment, where the chamber plate is a substantially flat sheet having plate holes configured to receive screwdrivers and hold the screwdrivers vertically and having plate slots configured to receive wrenches and hold the wrenches vertically, where the third compartment includes a midpoint divider positioned through a mid point of the I-shaped divider, where the four rectangular shaped chambers are six rectangular shaped chambers within the third compartment, and where the first partition and the second partition extend along the box bottom, where the first partition extends to a height that is below the right shelf and the second partition extends to a height that substantially resides at the box upper surface such that when the lid is closed, the first compartment largely is isolated from both the second compartment and the third compartment and the second compartment is not isolated from the third compartment, where the chamber plate is positioned relative to the lid such that when the lid is closed, the screwdrivers and wrenches are keep in place even if the wheel-mounted tool chest is turned upside down and back upright.

18. The wheel-mounted tool chest of claim 17, where the first compartment includes a volume that is larger than both a volume of the second compartment and a volume of the third compartment.

* * * * *